United States Patent

Cortes Guasch et al.

Patent Number: 5,454,290
Date of Patent: Oct. 3, 1995

[54] HYDRAULIC CONTROL DEVICE WITH MOVABLE VALVE

[75] Inventors: Esteve Cortes Guasch; Juan Simon Bacardit, both of Barcelone, Spain

[73] Assignee: Bendix Espana S.A., Barcelone, Spain

[21] Appl. No.: 133,076

[22] PCT Filed: Sep. 13, 1993

[86] PCT No.: PCT/EP93/02474

§ 371 Date: Oct. 12, 1993

§ 102(e) Date: Oct. 12, 1993

[87] PCT Pub. No.: WO94/08834

PCT Pub. Date: Apr. 28, 1994

[30] Foreign Application Priority Data

Oct. 15, 1992 [ES] Spain ................. 9202046

[51] Int. Cl.⁶ ................. F15B 9/10; F01B 31/14
[52] U.S. Cl. ................. 91/375 R; 91/380; 92/13.6; 180/132.5
[58] Field of Search ................. 92/13.2, 13, 13.6, 92/13.7; 91/374, 375 R, 375 A, 380; 180/132

[56] References Cited

U.S. PATENT DOCUMENTS

| 3,103,828 | 9/1963 | Stauss | 92/13 |
| 3,315,570 | 4/1967 | Brener et al. | |
| 3,771,421 | 11/1973 | Scheffer | 92/13.6 X |
| 4,625,624 | 12/1986 | Adams | 91/375 A |
| 4,648,367 | 3/1987 | Rabe | 91/375 A |
| 4,699,231 | 10/1987 | Lang et al. | 91/380 X |
| 5,322,142 | 6/1994 | Elser | 180/132 X |

FOREIGN PATENT DOCUMENTS

| 0321756 | 6/1989 | European Pat. Off. |
| 8907064 | 8/1989 | WIPO |
| 9203326 | 3/1992 | WIPO |

Primary Examiner—Edward K. Look
Assistant Examiner—Hoang Nguyen
Attorney, Agent, or Firm—Larry J. Palguta; Leo H. McCormick, Jr.

[57] ABSTRACT

A hydraulic control device comprises a valve (4) which can be moved inside a casing (1) and a stop for opening the valve at one point, the position of which may be set. The stop (6) slides in an axial housing (7) under the effect of a spring (8) and a stop screw (9). The opening position of the valve (4) may be easily set from outside the casing (1).

4 Claims, 2 Drawing Sheets

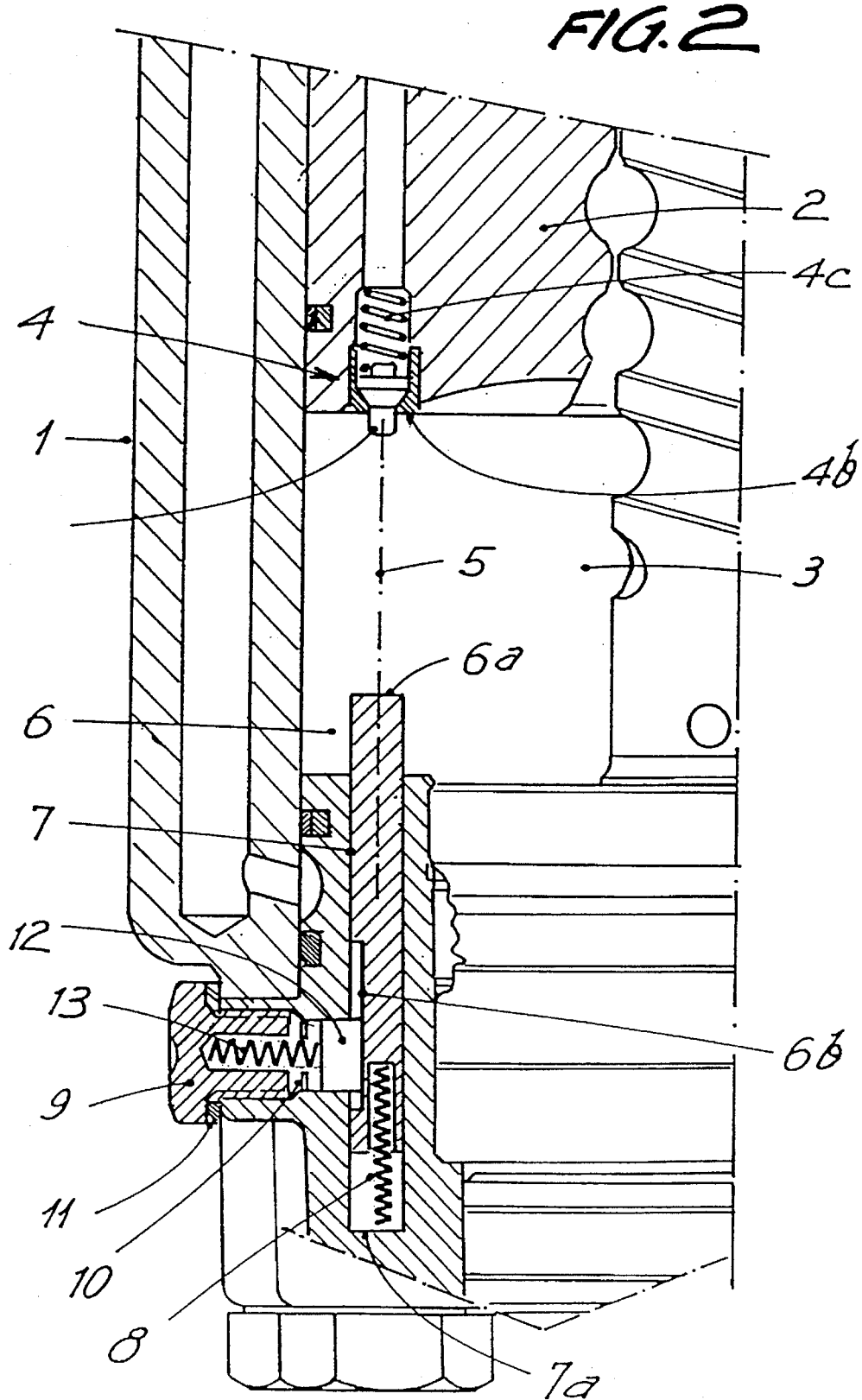

HYDRAULIC CONTROL DEVICE WITH MOVABLE VALVE

The present invention relates to a hydraulic control device comprising, on the one hand, a valve which can be moved along an axial direction inside a sealed casing filled with a fluid whose flow is at least controlled by this valve and, on the other hand, opening means which enable this movable valve to be opened in a selective fashion when it is moved, under the effect of a first axial force of higher intensity than a first threshold, into an open position, and this open position to be chosen from a range of possible positions extending along the axial direction.

Such devices are especially used in order to determine the operating range of hydraulically assisted steering systems for motor vehicles.

In these systems, assistance in maneuvering the steering wheel is obtained by a modulation of the hydraulic pressure in complementary chambers delimited by a piston inside a cylinder, the operating range of the system being determined by the stroke of this piston.

This stroke is itself defined by means of stop valves, open at the end of the stroke of the piston by virtue of the movement of the latter, and establishing, between the chambers, a passage of hydraulic fluid preventing any further modification in the pressure modulation in the same direction.

Such a device is, for example, described in the U.S. Pat. No. 3 315 570, several variants of which are known in the prior art.

Regardless of their means of production, the known devices have the fault of requiring, for setting the opening position of the movable valve, a dismantling of the casing in which it is to be found and/or recourse to relatively significant additional setting means.

In this context, the object of the invention is to provide a hydraulic control device with a movable valve of simple structure which is easy to manufacture and nevertheless allows setting of the opening position of the valve from the outside of the casing in which it is housed.

To this end, the device of the invention is provided with settable opening means comprising:

a stop slideably mounted in an axial housing facing the valve, this stop having one end in contact with which this valve can open when it is forced there by the first axial force;

elastic means exerting on the stop a second axial force opposed to the first and of lower intensity than the first threshold, these elastic means being sufficiently deformable to apply the second axial force to the stop regardless of the point of the said range at which the end of this stop is located; and means for the selective blocking of the stop, capable of selectively preventing the stop from sliding in its housing under the effect of axial forces of lower intensity than a second threshold, itself higher than the first threshold.

The blocking means may, for example, comprise a screw capable of moving in a bore which is at least partially tapped emerging into the said housing.

Furthermore, these blocking means preferably comprise a bearing bush bearing against the stop and a spring compressed by the screw and itself pressing on the bearing bush.

In a simple embodiment, the elastic means essentially comprise a spring trapped between the bottom of the housing and the axial stop.

Other features and advantages of the invention will emerge clearly from the description which is given below, by way of example and in no way limiting, with reference to the appended drawings in which:

FIG. 2 is a view similar to that of FIG. 1, relating to a second embodiment of the invention.

Figure 1:
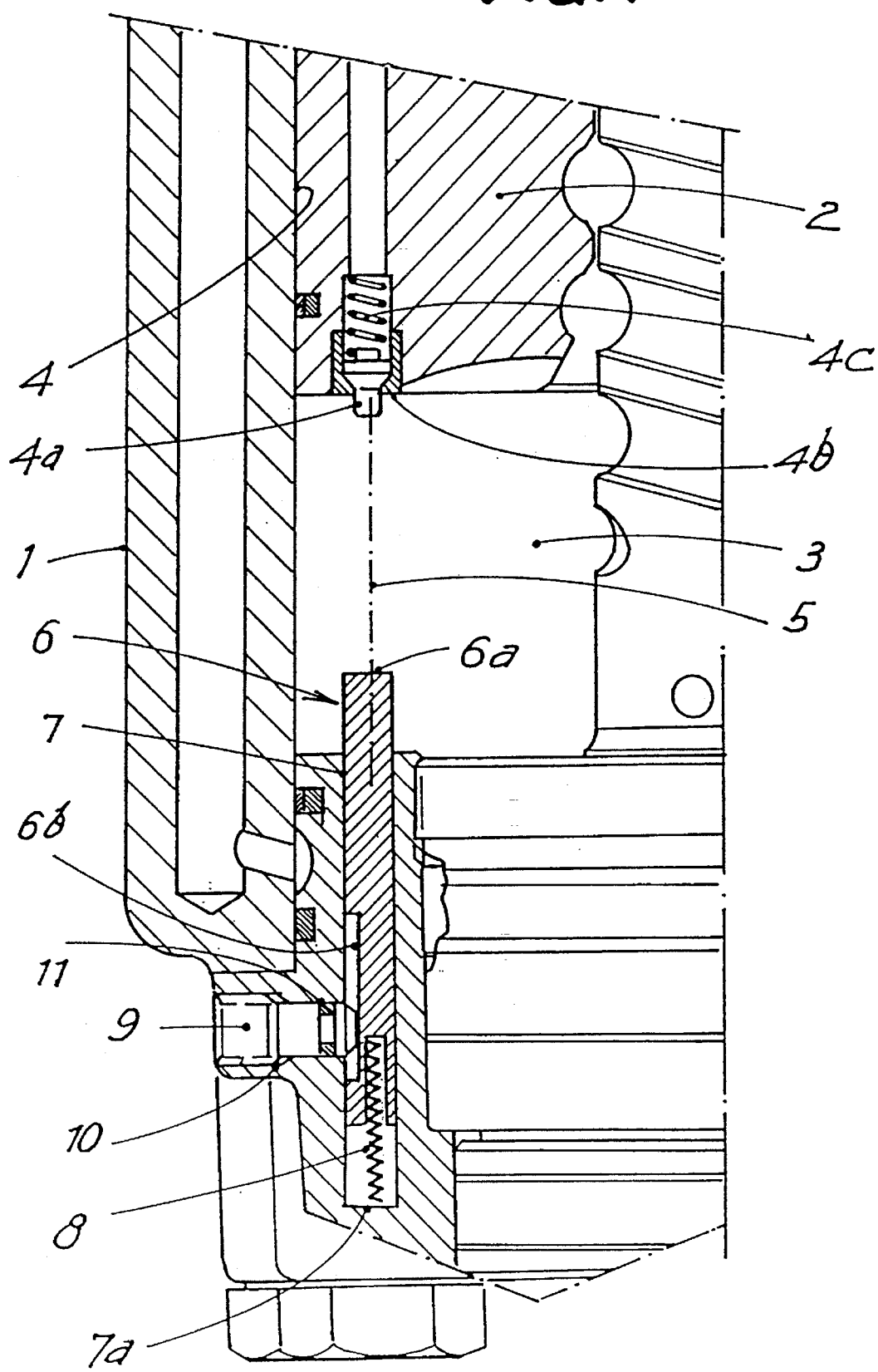
FIG. 1 is a sectional view of a device in accordance with the invention, used in a system viewed in partial section.

The figures represent a portion of a power-assisted steering system especially comprising a sealed casing 1 and a movable piston 2 delimiting at least one pressure chamber 3 filled with a hydraulic fluid.

The chamber 3 is closed in a sealed fashion by the piston 2, but a flow of fluid towards the outside of this chamber is possible, in a controlled fashion, by virtue of a movable valve 4 carried by the piston 2 and moving with it along the direction of the axis 5.

The movable valve 4 comprises a flap 4a forced against a seat 4b by a spring 4c exerting a force corresponding to a first threshold.

It is therefore possible, by exerting on the flap a an axial force directed upwards (in the direction of the figures) and of higher intensity than this first threshold, to open the valve 4 so as to allow the flow of fluid out of the chamber 3.

The opening of this valve is, in fact, obtained by applying the flap 4a against the end 6a of a stop 6, resulting from the movement of the piston 2 downwards under the effect of an axial force of higher intensity than the first threshold.

It is therefore possible, by choosing the position of the end 6a of the stop 6 along the axis 5, to set the opening position of the valve 4.

For this purpose, the stop 6 is slideably mounted in an axial housing 7 under the effect of a spring 8 trapped between the bottom 7a of the housing 7 and the stop 6.

In addition, the latter is held in place in its housing by virtue of a screw 9 capable of moving in a bore which is at least partially tapped 10 emerging into the said housing 7 and sealed relative to the outside by virtue of an annular seal 11 surrounding the screw 9.

The pressure prevailing in the housing 7 is the same as that which prevails in the chamber 3, the stop 6 thus not being subjected to any differential force capable of varying with this pressure.

Preferably, the stop 6 has a flat 6b whose length is at least equal to the desired length of the setting range of the opening position of the valve.

In the embodiment of FIG. 1, the screw 9 bears directly on the flat 6b and prevents, when it is screwed, the stop 6 from sliding in the housing 7, at least for as long as the axial forces to which the stop 6 is possibly subjected have a lower intensity than a threshold which is raised and is very substantially higher than the first threshold.

In contrast, the length and stiffness of the spring 8 are chosen so that, on the one hand, this spring only develops, regardless of its normal operating position, a force of lower intensity than the first threshold, so that, on the other hand, it pushes, when the screw 9 is unscrewed, the stop 6 upwards until the end 6a of the latter is at the highest point of the setting range, and finally so that it is still in a state of elastic deformation when the end 6a of the stop is placed at the lowest point of this setting range.

As the man skilled in the art will have already understood from reading the preceding description, the setting of the opening position of the valve 4 may be achieved therefore very simply by the following operations: the screw 9 is unscrewed; the axial stop 6 moves back upwards under the effect of the spring 8; the valve 4 is brought, by moving the piston 2, into the position where its opening is desired, this valve therefore pushing back the stop 6 into its housing without opening; finally, the screw 9 is rescrewed, wedging the stop at the chosen position.

FIG. 2 represents a second embodiment of the invention, in which the stop 6 is wedged by means of a bearing bush 12 bearing against it and by virtue of a spring 13 compressed by the screw 9 and forcing the bearing bush towards the stop, this bearing bush and this spring being at least partially housed in the tapped bore 10.

This second embodiment, in other respects equivalent to the first, allows a precise and at the same time very easy adjustment of the frictional force applied to the stop 6, and therefore the setting of the threshold for which the axial forces capable of being exerted on the stop 6 with a higher intensity than this threshold give rise to the sliding of the stop 6 in its housing 7.

We claim:

1. A hydraulic control device, comprising a valve which can be moved along an axial direction inside a sealed casing filled with a fluid the flow of which is controlled by said valve, and opening means which enables said valve to be opened selectively when a first axial force of higher intensity than a first threshold force forces said valve into an open position, said open position chosen from a range of positions extending along the axial direction, characterized in that the opening means comprises:

a stop mounted slideably in an axial housing facing the valve, said stop having one end causing the valve to open when said valve is forced against said stop by the first axial force;

elastic means exerting on the stop a second axial force opposed to the first axial force and of lower intensity than the first threshold force, said elastic means being sufficiently deformable to apply the second axial force to the stop regardless of the position at which the end of said stop is located; and means for blocking selectively the stop and capable of preventing selectively the stop from sliding in said housing when said stop is submitted to axial forces of lower intensity than a second threshold force which is higher than the first threshold force.

2. The device according to claim 1, characterized in that the blocking means comprises a screw capable of moving in a bore which is at least partially tapped emerging into said housing.

3. The device according to claim 2, characterized in that the blocking means comprises a bearing bush bearing against the stop and a spring compressed by the screw, said spring pressing on the bearing bush.

4. The device according to claim 2, characterized in that said elastic means comprises a spring trapped between a bottom of the housing and the axial stop.

* * * * *